US011970586B1

(12) United States Patent
Kocak et al.

(10) Patent No.: US 11,970,586 B1
(45) Date of Patent: Apr. 30, 2024

(54) COMPOSITE MATERIALS AND METHOD OF MAKING COMPOSITE MATERIALS

(71) Applicants: FLORIDA LEAGUE OF CITIES, INCORPORATED, Tallahassee, FL (US); United States Of America As Represented By The Administrator of NASA, Washington, DC (US)

(72) Inventors: Salih Kocak, Pace, FL (US); Christopher L. Holley, II, Tallahassee, FL (US); Nathan Gelino, Merritt Island, FL (US); Tracy Gibson, Melbourne, FL (US); James Captain, Titusville, FL (US); Robert P. Mueller, Cocoa Beach, FL (US)

(73) Assignees: FLORIDA LEAGUE OF CITIES, INCORPORATED, Tallahassee, FL (US); United States of America As Represented By The Administrator of NASA, Washington, DC (US)

( * ) Notice: Subject to any disclaimer, the term of this patent is extended or adjusted under 35 U.S.C. 154(b) by 0 days.

(21) Appl. No.: 18/207,540

(22) Filed: Jun. 8, 2023

Related U.S. Application Data

(60) Provisional application No. 63/350,264, filed on Jun. 8, 2022.

(51) Int. Cl.
*B29B 7/34* (2006.01)
*B29B 7/72* (2006.01)
*B29B 7/90* (2006.01)
*C08J 3/20* (2006.01)
*C08K 3/40* (2006.01)
*B29K 23/00* (2006.01)
*B29K 27/06* (2006.01)
*B29K 67/00* (2006.01)
*B29K 105/00* (2006.01)
*B29K 105/26* (2006.01)
*B29K 509/08* (2006.01)

(52) U.S. Cl.
CPC .............. *C08J 3/201* (2013.01); *B29B 7/34* (2013.01); *B29B 7/72* (2013.01); *B29B 7/90* (2013.01); *C08K 3/40* (2013.01); *B29K 2023/06* (2013.01); *B29K 2023/12* (2013.01); *B29K 2027/06* (2013.01); *B29K 2067/003* (2013.01); *B29K 2105/251* (2013.01); *B29K 2105/26* (2013.01); *B29K 2509/08* (2013.01); *B29K 2995/0077* (2013.01); *B29K 2995/0082* (2013.01); *C08J 2323/06* (2013.01); *C08J 2323/12* (2013.01); *C08K 2201/005* (2013.01)

(58) Field of Classification Search
USPC ........................................................ 521/47
See application file for complete search history.

(56) References Cited

U.S. PATENT DOCUMENTS

| 2,994,254 | A | 8/1961 | Shumaker |
| 4,427,818 | A | 1/1984 | Prusinski |
| 5,030,662 | A | 7/1991 | Banerjie |
| 5,221,702 | A | 6/1993 | Richards |
| 5,312,858 | A | 5/1994 | Folsom |
| 5,789,477 | A | 8/1998 | Nosker et al. |
| 5,853,634 | A | 12/1998 | Ontkean |
| 6,329,437 | B1 | 12/2001 | Vincent et al. |
| 6,984,670 | B2 | 1/2006 | Meyers, III et al. |
| 7,297,720 | B2 | 11/2007 | Meyers, III et al. |
| 9,724,853 | B2 | 8/2017 | Zavala |
| 9,951,191 | B2 | 4/2018 | Stanhope et al. |
| 9,976,018 | B2 | 5/2018 | Stanhope et al. |
| 2009/0062413 | A1 | 3/2009 | Adur et al. |
| 2009/0062431 | A1 | 3/2009 | Nasr et al. |
| 2009/0090535 | A1 | 4/2009 | Reyes et al. |
| 2011/0258956 | A1 | 10/2011 | Felton |
| 2013/0089692 | A1 | 4/2013 | Grasso, Jr. |
| 2013/0225702 | A1 | 8/2013 | Jang |
| 2014/0161525 | A1 | 6/2014 | Smith |

(Continued)

FOREIGN PATENT DOCUMENTS

| DE | 4343571 A1 | 6/1995 |
| GB | 2473426 A | 3/2011 |
| KR | 20040080387 A | 9/2004 |

(Continued)

OTHER PUBLICATIONS

Agyeman et al.; "Exploiting Recycled Plastic Waste AS an Alternative Binder for Pavingt Blocks Production"; ScienceDirect, Case Studies in Construction Materials; vol. 11; 2019.
Ali et al.; "Mechanical Properties of Polyethylene-Sand Blocks Produced from Recycled Plastic Bags"; International Journal of Scientific and Engineering Research; vol. 11; Issue 1; Jan. 2020.
Almeshal et al.; "Eco-friendly Concrete Containing Recycled Plastic as Partial Replacement for Sand"; ScienceDirect; Journal of Materials Research and Technology; vol. 9(3) pp. 4631-4643; 2020.
Appiah et al.; "Use of Waste Plastic Materials for Road Construction in Ghana"; ScienceDirect;Case Studies in Construction Materials; vol. 6; pp. 1-7; 2017.
Bolin et al.; "Life Cycle Assessment of Creosote-Treated Wooden Railroad Crossties in the US with Comparisons to Concrete and Plastic Composite Railroad Crossties"; Journal of Transportation Technologies; vol. 3; pp. 149-161; 2012.

(Continued)

*Primary Examiner* — Terressa Boykin
(74) *Attorney, Agent, or Firm* — Christopher M. Ramsey; GrayRobinson, P.A.

(57) ABSTRACT

A composite material may be prepared from a solid polymeric binder and a solid filler by feeding into an extruder the solid polymeric binder at a first feed rate and the solid filler at a second feed rate. The extruder extrudes an extrudate of the solid polymeric binder and solid filler to form the composite material. The composite material has a binder to filler ratio determined by the first feed rate and second feed rate. The solid polymeric binder and solid filler have different densities. Feeding the solid polymeric binder at the first feed rate and the solid filler at the second feed rate distributes the solid filler substantially homogeneously throughout the composite material.

30 Claims, 12 Drawing Sheets

(56) References Cited

U.S. PATENT DOCUMENTS

2014/0221553 A1\* 8/2014 Van Riemsdijk ....... B29C 48/55
524/508
2018/0118618 A1 5/2018 Bus

FOREIGN PATENT DOCUMENTS

| KR | 20080070233 A | 7/2008 |
|---|---|---|
| KR | 20100079679 A | 7/2010 |
| TW | 201305274 A | 2/2013 |

OTHER PUBLICATIONS

Cesar et al.; "Engineering Behavior of a Sand Reinforced with Plastic Waste"; Journal of Geotechnical and Geo environmental Engineering; Jun. 2002.
Chen et al.; "Rheological and Interaction Analysis of Asphalt Binder, Mastic and Mortar"; MDPI; 12, 128; 2019.
Colbert et al.; "Properties of Modified Asphalt Binders Blended with Electronic Waste Powders"; Journal of Materials in Civil Engineering; ASCE; Oct. 2012.
Colbert, Baron W.; "The Performance and Modification of Recycled Electronic Waste Plastics for the Improvement of Asphalt Pavement Materials"; Dissertation, Michigan Technological University; 2012.
Donadkar et al.; "Review of E-Waste Material Used in Making of Concrete"; International Journal of Science Technology and Engineerting; vol. 2; Issue 7; Jan. 2016.
Fang et al.; "Processing and Mechanical Properties of HA/UHMWPE Nanocomposites"; ScienceDirect, Biomaterials; vol. 27; pp. 3701-3707; 2006.
Faraj et al.; "Mechanical, Fracture and Durability Properties of Self-Compacting High Strength Concrete Containing Recycled Polypropylene Plastic Particles"; Journal of Building Engineering; vol. 25; 2019.
Frigione, Mariaenrica; "Recycling of PET Bottles as Fine Aggregate in Concrete"; ScienceDirect, Waste Management; vol. 30; pp. 1101-1106; 2010.
Gu et al.; "Use of Recycled Plastics in Concrete: A Critical Review"; ScienceDirect, Waste Management; vol. 51; pp. 19-42; 2016.
Hannawi et al.; "Physical and Mechanical Properties of Mortars Containing PET and PC Waste Aggregates"; ScienceDirect, Waste Management; vol. 30; pp. 2312-2320; 2010.
Herrera-Franco et al.; "Development and Characterization of a HDPE-sand-natural fiber composition"; Elsevier Science Limited; Coposites Part B; pp. 331-343; 1997.
Jibrael et al.; "Strength and Behavior of Concrete Contains Waste Plastic"; Journal of Ecosystem and Ecography; vol. 6:2; 2016.
Kumi-Larbi et al.; "Recycling waste plastics in developing countries: Use of low-density polyethylene water sachets to form plastic bonded sand blocks"; ScienceDirect, Waste Management; vol. 80; pp. 112-118; 2018.
Liu et al.; "A Novel Rammed Earthn Material Stabilized With Steel Slags"; ScienceDirect, Construction and Building Materials; vol. 189; pp. 1134-1139; 2018.
Lokesh, K.S.: "Preparation and Mechanical Testing of E-waste Glass Filled Polymer Composites"; Intenrational Journal of Scientific Research in Mechanical and Materials Engineering; vol. 3; Issue 1; 2019.
Lokesh; "Abrasive Study of ELT Rubber Loaded With Fibre Reinforced Plastics"; International Journal of Scientific Research in Mechanical and Materials Engineering; vol. 2; Issue 5; 2018.
Mitchell et al.; "Recycling Disposable Cups Into Paper Plastic Composites"; ScienceDirect, Waste Management; vol. 34; pp. 2113-2119; 2014.
Mohan et al.; "Performance Assessment of Recycled LDPE with Sand Fillers"; SciencDirect, Materials Today: Proceedings; vol. 42; pp. 1526-1530; 2021.

Parron-Rubio et al.; "Slag Substitution as a Cementing Material in Concrete: Mechanical, Physical and Environmental Properties"; MDPI; Materials; vol. 12; 2019.
Pogrebnyak et al.; "A Wood-Filled Composite Based on Recycled Polyethylene Terephthalate. Production and Properties"; International Polymer Science and Technology; vol. 42, No. 1; 2015.
Rajendran et al.; "Environmental Impact Assessment of Composites Containing Recycled Plastics"; ScienceDirect, Resources, Conservation and Recycling; vol. 60; pp. 131-139; 2012.
Safi et al.; "The Use of Plastic Waste as Fine Aggregate in the Self-Compacting Mortars: Effect on Physical and Mechanical Properties"; ScienceDirect, Construction and Building Materials; vol. 43; pp. 436-442; 2013.
Safinia et al.; "Use of Recycled Plastic Water Bottles in Concrete Blocks"; ScienceDirect; Procedia Engineering; vol. 164; pp. 214-221; 2016.
Sahajwalla et al.; "The Present and Future of E-Waste Plastics Recycling"; ScienceDirect, Current Opinion in Green and Sustainable Chemistry; vol. 13; pp. 102-107; 2018.
Saikia et al.; "Mechanical Properties and Abrasion Behaviour of Concrete Containing Shredded PET Bottle Waste as a Partial Substitution of Natural Aggregate"; ScienceDirect, Construction and Building Materials; vol. 52; pp. 236-244; 2014.
Sathishkumar et al.; "Glass Fiber-Reinforced Polymer Composites—a Review"; Journal of Reinforced Plastics and Composites; vol. 33(13); pp. 1258-1275; 2014.
Sharma et al.; "Use of Different Forms of Waste Plastic in Concrete—a Review"; ScienceDirect, Journal of Cleaner Production; vol. 112; pp. 473-482; 2016.
Shayan et al.; "Value-added utilisation of waste glass in concrete"; ScienceDirect, Cement and Concrete Research; vol. 34; pp. 81-89; 2004.
Shiri et al.; "Processing of Waste Plastics Into Building Materials Using a Plastic Extruder and Compression Testing of Plastic Bricks"; Journal of Mechanical Engineering and Automation; vol. 5(3B); pp. 39-42; 2015.
Silva et al.; "Incorporation of Fine Plastic Aggregates in Rendering Mortars"; ScienceDirect, Construction and Building Materials; vol. 71; pp. 226-236; 2014.
Slieptsova et al.; "Polymer Sand Composites Based on the Mixed and Heavily Contaminated Thermoplastic Waste"; IOP Conf. Series; Materials Science and Engineering; vol. 111; 2016.
Sui et al.; "A plant fiber reinforced polymer composite prepared by a twin-screw extruder"; ScienceDirect, Bioresource Technology; vol. 100; pp. 1246-1251; 2009.
Sullins et al.; "Hemp Fiber Reinforced Polypropylene Composites: The Effects of Material Treatments"; ScienceDirect, Composites Part B; vol. 114; pp. 15-22; 2017.
Susila et al.; "The effect of Composition of Plastic Waste Low Density Polyethylene (LDPE) with Sand to Pressure Strength and Density of Sand/LDPE Composites"; International Conference on Design, Energy, Materials and Manufacture; IOP Conference Series; 539; 2019.
Tawfik et al.; "Polymer Concrete from Marble Wastes and Recycled Poly(ethylene terephthalate)"; Journal of Elastomers and Plastics; vol. 38; Jan. 2006.
Thattaiparthasarthy et al.; "Rheological Characterization of Long Fiber Thermoplastics—Effect of Temperature, Fiber Length and Weight Fraction"; ScienceDirect, Composites: Part A; vol. 40; pp. 1515-1523; 2009.
Thorneycroft et al.; "Performance of Structural Concrete With REcycled Plastic Waste as a Partial Replacment for Sand"; ScienceDirect, Construction and Building Materials; vol. 161; pp. 63-69; 2018.
Tufa et al.; "Study of Sand-Plastic Composite Using Optimal Mixture Design of Experiments for Best Compressive Strength"; ScienceDirect, Materials Today: Proceedings; vol. 47; pp. 480-487; 2021.
Yang et al.; "Properties of Lignocellulosic Material Filled Polypropylene Bio-Composites Made With Different Manufacturing Processes"; ScienceDirect, Polymer Testing; vol. 25; pp. 668-676; 2006.

(56) References Cited

OTHER PUBLICATIONS

Zhuang et al.; "Mechanical Properties of Potassium Titanate Whiskers Reinforced Poly(ether ether ketone) kcomposites Using Different Compounding Processes"; ScienceDirect, Composites Science and Technology; vol. 67; pp. 1172-1181; 2007.

* cited by examiner

| 1 | 2 | 3 | 4 | 5 | 6 | 7 |
|---|---|---|---|---|---|---|
| PETE | HDPE | PVC | LDPE | PP | PS | OTHER |
| Polyethylene Terephthalate | High-Density Polyethylene | Polyvinyl Chloride | Low-Density Polyethylene | Polypropylene | Polystyrene | Other |
| Common products: soda & water bottles, cups, jars, trays, clamshells | Common products: milk jugs, detergent and shampoo bottles, flower pots, grocery bags | Common products: cleaning supply jugs, pool liners, twine, sheeting, automotive product bottles | Common products: bread bags, paper towel and tissue overwrap, squeeze bottles, trash bags, six-pack rings | Common products: yogurt tubs, cups, juice bottles, straws, hangers, sand & shipping bags | Common products: to go containers, flatware, hot cups, razors, CD cases, shipping cushion, cartons, trays | Common types & products: polycarbonate, nylon, ABS, acrylic, PLA; bottles, safety glasses, CDs, headlight lenses |
| Recycled products: clothing, carpet, clamshells, soda & water bottles | Recycled products: detergent bottles, flower pots, crates, pipe, decking | Recycled products: pipe, wall siding, binders, carpet backing, flooring | Recycled products: trash bags, plastic lumber, furniture, shipping envelopes, compost bins | Recycled products: paint cans, speed bumps, auto parts, food containers, hangers, plant pots, razor handles | Recycled products: picture frames, crown molding, rulers, flower pots, hangers, toys, tape dispensers | Recycled products: electronic housings, auto parts |

*FIG. 1*

| Sieve Size | Fine Glass | Medium Glass | Coarse Glass | Sand | Recycled Concrete |
|---|---|---|---|---|---|
| 2.36 mm (#8) | 100.0% | 100.0% | 100.0% | 100.0% | 100.0% |
| 1.18 mm (#16) | 100.0% | 100.0% | 99.7% | 97.3% | 92.6% |
| 0.600 mm (#30) | 99.7% | 99.9% | 38.8% | 74.8% | 75.5% |
| 0.300 mm (#50) | 99.6% | 32.7% | 0.8% | 20.4% | 38.2% |
| 0.150 mm (#100) | 53.2% | 0.9% | 0.5% | 2.2% | 10.9% |
| 0.075 mm (#200) | 15.8% | 0.2% | 0.2% | 0.2% | 2.6% |

*FIG. 5*

| Filler : Binder % w/w Ratio | | Fillers | | | | | | |
|---|---|---|---|---|---|---|---|---|
| | | Sand | | | Recycled Glass | | Recycled Concrete | |
| Binders | PP | 25 : 75 | 50 : 50 | 75 : 25 | 65 : 35 | 50 : 50 | 25 : 75 | 50 : 50 |
| | PE | 25 : 75 | 50 : 50 | 75 : 25 | 25 : 75 | 50 : 50 | 25 : 75 | 50 : 50 |

*FIG. 6*

| Strength Correlations for Normal Strength Structural Concrete | | |
|---|---|---|
| Compressive Strength (psi) | Tensile Strength (psi) | Flexural Strength (psi) |
| 2500 | 335 | 424 |
| 3000 | 367 | 478 |
| 3500 | 396 | 530 |
| 4000 | 424 | 580 |
| 4500 | 449 | 627 |
| 5000 | 474 | 673 |
| 5500 | 497 | 717 |
| 6000 | 519 | 759 |

*FIG. 7*

| Material Formulation | Compressive Strength | | |
| --- | --- | --- | --- |
| | At 10% Strain | Ultimate Strength | Strain @ Ultimate Strength |
| | | | |
| 100%PE | 3430 | 7624 | 56.63% |
| 75%PE+25%S | 3423 | 8051 | 65.40% |
| 50%PE+50%S | 3438 | 5475 | 55.80% |
| 50%PE+50%Gm | 2996 | 5534 | 60.69% |
| 50%PE+50%RC | 3336 | 3686 | 45.26% |
| 25%PE+75%S | 3214 | 3209 | 9.22% |
| 25%PE+75%Gc | 2413 | 2536 | 37.99% |
| | | | |
| 100%PP | 3894 | 6046 | 55.89% |
| 35%PP+65%Gm | 5063 | 7301 | 55.43% |
| 50%PP+50%S | 3648 | 5026 | 55.51% |
| 50%PP+50%Gf | 3192 | 3708 | 48.62% |
| 50%PP+50%Gm | 3249 | 4424 | 53.90% |
| 50%PP+50%RC | 3396 | 3471 | 7.66% |
| 25%PP+75%S | 2932 | 3014 | 7.49% |

*FIG. 11*

| Material Formulation | Tensile Strength | |
|---|---|---|
| | Maximum Strength | Strain @ Max Strength |
| 100%PE | 1956 | 4.38% |
| 75%PE+25%S | 2249 | 9.60% |
| 50%PE+50%S | 1590 | 7.02% |
| 50%PE+50%Gm | 1311 | 6.45% |
| 50%PE+50%RC | 1527 | 3.57% |
| 25%PE+75%S | 933 | 3.02% |
| 25%PE+75%Gc | 730 | 7.09% |
| 100%PP | 2753 | 3.76% |
| 35%PP+65%Gm | 2029 | 5.74% |
| 50%PP+50%S | 1661 | 3.96% |
| 50%PP+50%Gf | 1314 | 3.44% |
| 50%PP+50%Gm | 1488 | 4.12% |
| 50%PP+50%RC | 1349 | 3.01% |
| 25%PP+75%S | 955 | 4.60% |

*FIG. 14*

| Material Formulation | Flexural Strength-Strain Values | | |
|---|---|---|---|
| | At 2% Strain (psi) | Ultimate Strength (psi) | Strain @ Ultimate Strength (%-in/in) |
| | | | |
| 100%PE | 1637 | 1661 | 1.73% |
| 75%PE+25%S | 1671 | 1709 | 1.70% |
| 50%PE+50%S | 1792 | 1888 | 1.47% |
| 50%PE+50%Gm | 1449 | 1496 | 1.55% |
| 50%PE+50%RC | 1992 | 2144 | 1.58% |
| 25%PE+75%S | 1644 | 1819 | 1.24% |
| 25%PE+75%Gc | 1099 | 1168 | 1.46% |
| | | | |
| 100%PP | 2736 | 2773 | 1.76% |
| 35%PP+65%Gm | 3160 | 3359 | 1.65% |
| 50%PP+50%S | 2309 | 2413 | 1.59% |
| 50%PP+50%Gf | 1869 | 1969 | 1.48% |
| 50%PP+50%Gm | 2013 | 2110 | 1.51% |
| 50%PP+50%RC | 2337 | 2507 | 1.33% |
| 25%PP+75%S | 1700 | 1854 | 1.46% |

FIG. 15

COMPOSITE MATERIALS AND METHOD OF MAKING COMPOSITE MATERIALS

CROSS-REFERENCE TO RELATED APPLICATION

This claims the benefit of priority from Application No. 63/350,264, filed Jun. 8, 2022, which is incorporated by reference in its entirety.

STATEMENT REGARDING FEDERALLY SPONSORED RESEARCH OR DEVELOPMENT

The invention described herein may be manufactured and used by or for the U.S. Government for U.S. Government purposes without the payment of royalties thereon or therefore.

BACKGROUND

Many municipal curbside recycling programs fund their operations by selling recyclable waste. Unfortunately, over the past several years, the price of recyclable plastic and glass waste has dropped due to lack of demand. This price drop has put these recycling programs at risk financially. The lack of demand also means that more recyclable waste plastic and glass is being sent to landfills rather than being put to further use in the market. This places a larger strain on waste processing facilities, landfills, and the environment.

BRIEF SUMMARY

To solve these problems, a new process for preparing composite materials made of a solid polymer binder and a solid filler has been developed. Many of the composite materials prepared according to this process have mechanical properties that exceed those of concrete in some respects, which means the composite materials may be used as a substitute for, or a supplement to, concrete construction materials. The solid polymer binder and solid filler may, in some cases, be from recycled sources.

An example of a method includes preparing a composite material from a solid polymeric binder and a solid filler by feeding into an extruder the solid polymeric binder at a first feed rate and the solid filler at a second feed rate. The extruder (a) melts the solid polymeric binder, (b) mixes the melted solid polymeric binder with the solid filler, and (c) extrudes an extrudate of the solid polymeric binder and solid filler to form the composite material. The composite material has a binder to filler ratio determined by the first feed rate and second feed rate. The solid polymeric binder and solid filler have different densities and feeding the solid polymeric binder at the first feed rate and the solid filler at the second feed rate distributes the solid filler substantially homogeneously throughout the composite material.

The method may also include one or more of the following features.

The solid polymeric binder may be a recycled solid polymeric binder and the solid filler may be a recycled solid filler.

The first feed rate and second feed rate may be controlled independently of one another.

In certain examples, the solid polymeric binder and the solid filler are not mixed together prior to feeding them into the extruder.

The solid filler may be granular glass and the solid polymeric binder may be at least one of polypropylene, polyethylene, polyvinyl chloride, and polyethylene terephthalate.

The composite material may include 15% w/w to 85% w/w solid polymeric binder and 85% w/w to 15% w/w solid filler.

The solid polymeric binder may include polyethylene while the solid filler includes granular glass and the composite material includes 85% w/w to 50% w/w polyethylene and 15% w/w to 50% w/w granular glass.

The solid polymeric binder may include polypropylene while the solid filler includes granular glass and the composite material includes 40% w/w to 30% w/w polypropylene and 60% w/w to 70% w/w granular glass.

The first feed rate and second feed rate may be independently selected in such a way that a binder to filler ratio is 85% w/w binder:15% w/w filler to 50% w/w binder:50% w/w filler.

The first feed rate and second feed rate may be independently selected in such a way that the binder to filler ratio is 30% w/w binder:70% w/w filler to 40% w/w binder:60% w/w filler.

The solid filler may have an average particle size of 0.1 mm to 2.5 mm.

The method may also include molding the composite material into a construction product selected from at least one of slab, brick, block, pipe, rod, walkway, driveway, wall, curb, culvert, road, and paver.

The method may also include molding the composite material into a construction product selected from at least one of slab, brick, block, pipe, rod, walkway, driveway, wall, curb, culvert, road, and paver, wherein the composite material is 80% w/w to 25% w/w solid polymeric binder and 20% w/w to 75% w/w solid filler.

The composite material may have a compressive strength at 10% strain of 2500 psi to 6000 psi.

The composite material may have a tensile strength of 400 psi to 3000 psi.

The composite material may have a flexural stress at 2% strain of 500 psi to 4000 psi.

In a certain example, the solid polymeric binder is polyethylene or polypropylene and the solid filler is granular glass. The composite material includes 85% w/w to 50% w/w binder and 15% w/w to 50% w/w granular glass when the solid polymeric binder is polyethylene. The composite material includes 40% w/w to 30% w/w binder and 60% w/w to 70% w/w granular glass when the solid polymeric binder is polypropylene. The composite material has a compressive strength at 10% strain of 2500 psi to 6000 psi, a tensile strength of 400 psi to 3000 psi, and a flexural stress at 2% strain of 500 psi to 4000 psi.

An example of a composite material includes 85% w/w to 50% w/w polyethylene binder and 15% w/w to 50% w/w granular glass filler. The polyethylene binder forms a binder matrix that binds together the granular glass filler.

The composite material may also include one or more of the following features.

The composite material may include 80% w/w to 60% w/w polyethylene binder and 20% w/w to 40% w/w granular glass filler.

The granular glass filler may have an average particle size of 0.1 mm to 2.5 mm.

The composite material may be an extrudate while the granular glass filler is substantially homogeneously distributed within the binder matrix.

The composite material may be a construction product selected from at least one of a slab, brick, block, pipe, rod, walkway, driveway, wall, curb, culvert, road, and paver.

The composite material may be a construction product selected from at least one of a slab, brick, block, pipe, rod, walkway, driveway, wall, curb, culvert, road, and paver, wherein the composite material is 80% w/w to 25% w/w solid polymeric binder and 20% w/w to 75% w/w solid filler.

The composite material may have a compressive strength at 10% strain of 2500 psi to 6000 psi.

The composite material may have a tensile strength of 400 psi to 3000 psi.

The composite material may have a flexural stress at 2% strain of 500 psi to 4000 psi.

The composite material may have a compressive strength at 10% strain of 2500 psi to 6000 psi, a tensile strength of 400 psi to 3000 psi, and a flexural stress at 2% strain of 500 psi to 4000 psi.

The polyethylene may be recycled polyethylene while the granular glass is recycled glass.

Another example of the composite material includes 40% w/w to 30% w/w polypropylene binder and 60% w/w to 70% w/w granular glass filler. The polypropylene binder forms a binder matrix that binds together the granular glass filler.

The composition may also include one or more of the following features.

The composite material may include 32% w/w to 38% w/w polypropylene binder and 68% w/w to 62% w/w granular glass filler.

The granular glass filler may have an average particle size of 0.1 mm to 2.5 mm.

The composite material may be an extrudate while the granular glass filler is substantially homogeneously distributed within the binder matrix.

The composite material may be a construction product selected from at least one of a slab, brick, block, pipe, rod, walkway, driveway, wall, curb, culvert, road, and paver.

The composite material may be a construction product selected from at least one of a slab, brick, block, pipe, rod, walkway, driveway, wall, curb, culvert, road, and paver, wherein the composite material is 80% w/w to 25% w/w solid polymeric binder and 20% w/w to 75% w/w solid filler.

The composite material may have a compressive strength at 10% strain of 2500 psi to 6000 psi.

The composite material may have a tensile strength of 400 psi to 3000 psi.

The composite material may have a flexural stress at 2% strain of 500 psi to 4000 psi.

The composite material may have a compressive strength at 10% strain of 2500 psi to 6000 psi, a tensile strength of 400 psi to 3000 psi, and a flexural stress at 2% strain of 500 psi to 4000 psi.

The polypropylene may be recycled polypropylene and granular glass may be recycled glass.

BRIEF DESCRIPTION OF THE DRAWINGS

FIG. 1 is a list of recyclable plastics.

FIG. 5 is a table of the particle sizes for various fillers.

FIG. 6 is a matrix of different composite material samples prepared in the Examples.

FIG. 7 is a table of the strength correlations for normal strength structural concrete.

FIG. 11 is a table of the compressive strength at 10% strain and ultimate strength at the corresponding strain.

FIG. 14 is a table of the maximum tensile strength and corresponding strain at maximum strength.

FIG. 15 is a table of the ultimate flexural strength at the corresponding strain and the flexural strength at 2% strain.

DETAILED DESCRIPTION OF EXAMPLE EMBODIMENTS

Figure 2:
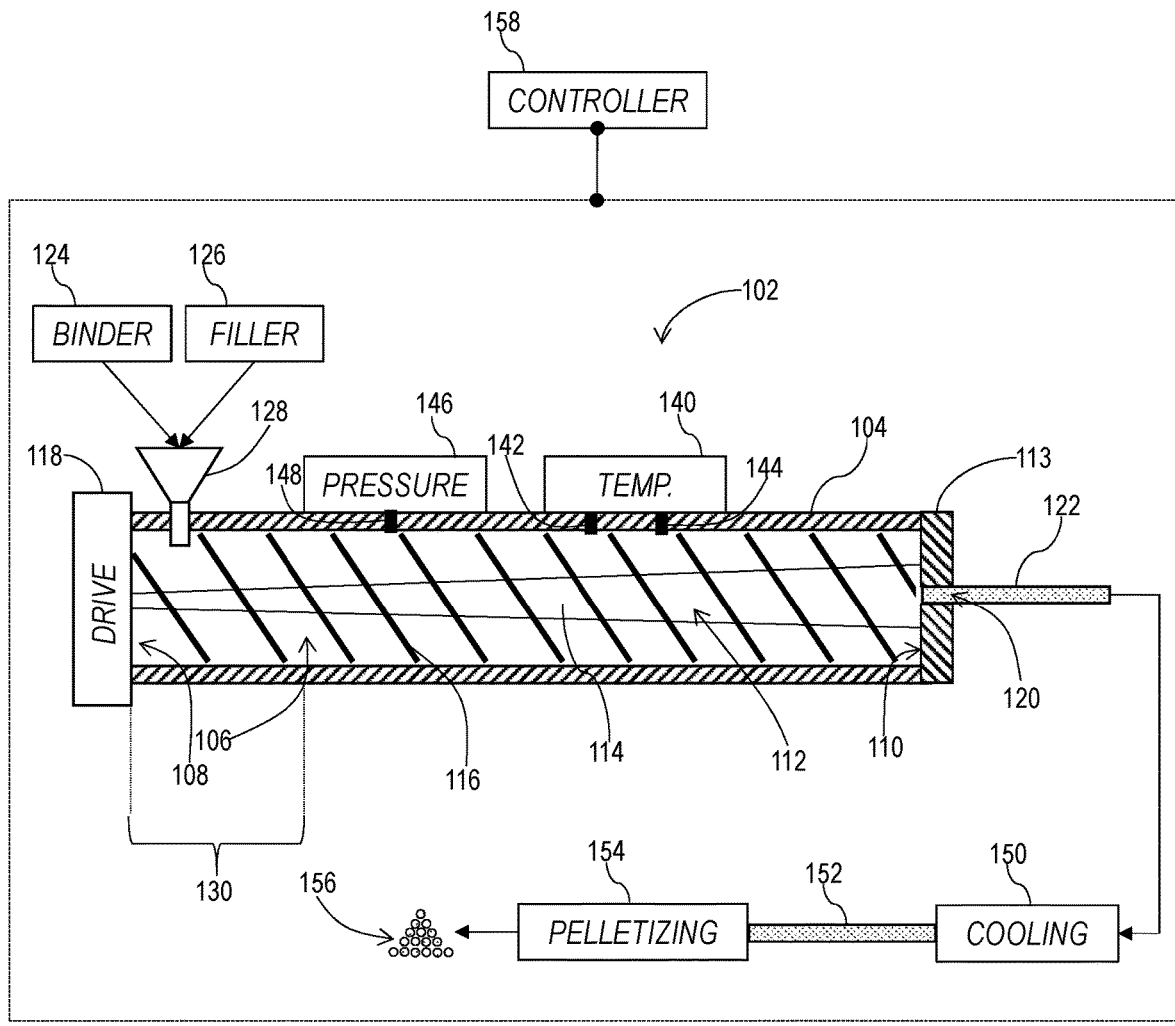
FIG. 2 is a block diagram of an example of a system for preparing a composite material.

This disclosure describes example aspects and embodiments, but not all possible aspects or embodiments of the composite materials and methods. Where a particular feature is disclosed in the context of a particular aspect or embodiment, that feature can also be used, to the extent possible, in combination with and/or in the context of other aspects and embodiments. The composite materials and methods may be embodied in many different forms and should not be construed as limited to only the aspects, examples, and embodiments described here.

The composite material generally includes a binder and a filler that are intermixed to form a substantially homogeneous solid composite material. The binder includes a thermoplastic polymer and the filler includes a solid particulate material. When the binder is melted, the filler maintains its solid particulate state and the melted binder encapsulates the filler. When the binder/filler mixture is cooled, the binder solidifies and binds the filler particles together into a monolithic composite material. Some examples of composite materials described herein have better mechanical properties than structural concrete.

The binder is at least partially composed of a thermoplastic polymer that melts and flows at the melting temperature of the polymer. The binder may be selected from, for example, at least one thermoplastic polymer material such as polypropylene (PP), polyethylene (PE), polyethylene terephthalate (PET), polystyrene (PS), and polyvinyl chloride (PVC), among other plastics. Such thermoplastic materials may be virgin plastics or they may be obtained from recycled solid waste.

Obtaining binders from recycled solid waste will provide a new commercial use for recycled binder material.

Another example of a possible recycled solid waste binder is commingled plastic waste, which is a mixture of various waste plastic materials. Yet another example of a possible recycled solid waste binder is waste plastic shopping bags, which are typically made of polyethylene. In yet another example, plastic waste retrieved from the ocean, called "ocean plastic" may also serve as a binder. This is not an exhaustive list of the possible binders.

FIG. 1 provides examples of a few of the many different possible binder materials along with their recycling codes. It also provides examples of some of the common products that incorporate these plastics and common products into which these plastics are recycled.

If a recycled plastic solid waste binder material is used, the binder may typically be prepared by obtaining the material from a solid waste or recycling facility and cleaning it or not cleaning it. If a virgin plastic is used as the binder material, it may not need to be cleaned before use. In some cases, it may be useful to turn the binder into individual small pieces of the binder material by shredding, crushing, cutting, chipping, or the like. The dimensions of these small pieces are not critical, but they are preferably small enough to be metered out in an accurate and quickly measurable manner. As an example, these pieces may typically be on the order of about 1-50 mm long, 1-50 mm wide, and 1-50 mm thick. Shredded plastic pieces do not typically have uniform dimensions. In some instances, it is not necessary to turn the binder material into individual small pieces when preparing the composite material.

The binder is selected so as to melt at a desired processing temperature and form a liquid phase with which the filler is intermixed. The filler forms a solid phase within the melted binder material. When the heated composite material cools below the melting temperature of the binder, the binder solidifies and forms a structural component that binds the filler material together.

The filler is a solid material that maintains its original physical form when heated and mixed with the melted polymer binder. The filler may be in the form of particles, such as granules, flakes, fibers, chunks, or other particulate forms. Examples of a few possible fillers include glass, recycled concrete, recycled tires, carbon black, plastic flake, fibers, sand, commingled plastic and the like. This is not an exhaustive list of the possible fillers.

Commingled plastics may also be used as a filler. This may be accomplished by granulating, shredding, or the like the commingled plastic into particulate form and selecting a binder that has a melting temperature less than or equal to the melting temperature of the commingled plastic. Plastics in the commingled plastics that have the same or a lower melting temperature as the binder will melt and add to the mass fraction of the binder. Plastics in the commingled plastics that have a higher melting temperature than the binder will remain solid and add to the filler mass fraction.

Commingled plastics may include, for example, polyethylene terephthalate, high density polyethylene, polyvinyl chloride, low density polyethylene, polypropylene, polystyrene, polycarbonate, nylon, acrylonitrile butadiene styrene, acrylic, polylactic acid, and/or others.

As with the binder, obtaining the filler from recycled solid waste will provide a new commercial use for such waste. If the filler includes recycled solid waste material, the filler may be prepared by obtaining the bulk filler material from a solid waste or recycling facility, cleaning it, or not cleaning it, and granulating it through crushing, pulverizing or the like to form filler granules. The particle size of the filler is selected in such a way that the particles are smaller than the diameter of the orifice of the extruder die. In certain examples, the particle size of the filler is no more than 75% of the diameter of the orifice of the extruder die. In other examples, the filler is no more than 25% of the diameter of the orifice of the extruder die. The particle size may be measured by passing the filler over a sieve of a desired size and discarding filler that is retained on the sieve. The size of the filler may also affect the mechanical properties of the finished composite material.

Because many of the filler particles might not have a uniform shape, the particle size may be determined in terms of the ASTM sieve size through which the particles used in the composite material cannot pass. In a typical sample, the filler particle size has an average of 2.5 mm to 0.1 mm, 1.5 mm to 0.1 mm, 1 mm to about 0.1 mm. In more examples, the filler particle size may have at least 99% of the particles <2.5 mm.

Waste glass is typically responsible for a large percentage of all recycled materials that run through recycling facilities. In Leon County, Florida, for example, it is estimated that glass takes up 22.9% of the total mass of materials in the recycling stream. Unfortunately, however, because recycled glass has such a low market value, it is more economical for recycling facilities to pay to have the glass taken to a landfill at a cost of $20 per ton instead of attempting to sell it.

These issues make waste glass a particularly valuable filler. The composite materials including waste glass may provide a commercial market for waste glass that will reduce the amount being sent to landfills. Surprisingly, as the examples show, granular waste glass also unexpectedly yields a very strong composite material with mechanical properties that are better than concrete in some respects.

If the binder and filler are obtained from solid waste, there may be a relatively small amount of extraneous contaminants in the finished composite material. Such contaminants may include organic waste, paper, other plastics, metals, or other materials in solid waste. The amount of contaminants will typically be <5% w/w of the finished composite material. If contaminants are present, they may not be detected and may be included in the % w/w measured for the binder and the filler, depending on where the contaminants are located.

In certain examples, the composite material is at least 99% w/w solid waste material. In other examples, the composite material is at least 97.5% w/w solid waste material. In yet other examples, the composite material is at least 95% w/w solid waste material. Here, solid waste material is solid waste obtained directly or indirectly from a trash collection, trash processing facility, material recovery facility, or the like.

The relative amount of binder and filler in the composite material will affect the composite material's mechanical properties. This gives the user the flexibility to formulate a composite material to obtain a material with the desired mechanical properties. Additionally, formulations for the composite material can be tailored to provide desired application-specific properties such as color, abrasion resistance, UV resistance, reflectivity, insulation values, and other properties.

In certain particular examples of the composite material, the binder is at least one of polypropylene, polyethylene, and polyethylene terephthalate and the filler is granular glass. Here, granular glass may be obtained from virgin glass and/or consumer waste glass from containers, bottles, windows, etc. It is to be understood that the term "granular glass" is not intended to include fiberglass, which is glass in a fibrous form.

The relative amount of the binder and filler may be expressed as the % w/w of each in the composite material.

In a particular example, when polyethylene is the binder, certain examples of the composite material may include: 85% w/w to 15% w/w binder and 15% w/w to 85% w/w filler; 50% w/w to 85% w/w binder and 50% w/w to 15% w/w filler; 50% w/w to 75% w/w binder and 50% w/w to 25% w/w filler; 55% w/w to 85% w/w binder and 45% w/w to 15% w/w filler; 60% w/w to 85% w/w binder and 40% w/w to 15% w/w filler; 65% w/w to 85% w/w binder and 35% w/w to 15% w/w filler; 75% w/w to 85% w/w binder and 25% w/w to 15% w/w filler; 80% w/w to 85% w/w binder and 20% w/w to 15% w/w filler; 50% w/w to 90% w/w binder and 50% w/w to 10% w/w filler; 55% w/w to 90% w/w binder and 45% w/w to 10% w/w filler; 60% w/w to 90% w/w binder and 40% w/w to 10% w/w filler; 65% w/w to 90% w/w binder and 35% w/w to 10% w/w filler; 75% w/w to 90% w/w binder and 25% w/w to 10% w/w filler; or 80% w/w to 90% w/w binder and 20% w/w to 10% w/w filler.

In another particular example, when polypropylene is the binder, certain examples of the composite material may include: 85% w/w to 15% w/w binder and 15% w/w to 85% w/w filler; 40% w/w to 30% w/w binder and 60% w/w to 70% w/w filler; 32% w/w to 38% w/w binder and 62% w/w to 68% w/w filler; or about 35% w/w binder and about 65% w/w filler.

The aforementioned ranges for polyethylene and polypropylene may also apply to other binders besides polyethylene and polypropylene.

When polyethylene is the binder, the Examples show that the mechanical strength of the composite material is typically highest when the composite material is 80% w/w to 60% w/w binder and 20% w/w to 40% w/w filler.

When polyethylene is the binder, the Examples also show that the flexural strength of the composite material is typically highest when the composite material is 80% w/w to 25% w/w binder and 20% w/w to 75% w/w filler. This may be valuable for preparing horizontal structures such as sidewalks, slabs, roads, and the like.

In contrast, when polypropylene is the binder, the Examples show that the mechanical strength of the composite material is typically highest when the composite material is 30% w/w to 40% w/w binder and 60% w/w to 70% w/w filler.

If it is desirable to use the composite material in place of concrete, it is desirable to prepare the strongest material possible. But the desired strength may depend on whether more compressibility, flexibility, or ductility is desired. The composite material may be formulated to the desired specifications by adjusting the relative amounts of binder and filler.

In certain examples, the composite material has a compressive strength of at least 2500 psi or from 2500 psi to 6000 psi.

In certain examples, the composite material has a tensile strength of at least 400 psi or from 400 psi to 3000 psi.

In certain examples, the composite material has a flexural stress at 2% strain of at least 500 psi or from 500 psi to 4000 psi.

The composite material may include a combination of different binders and/or a combination of different fillers.

One of the difficult aspects of forming a substantially homogeneous solid composite structure from the binder and filler is that the binder and filler typically have very different densities. This causes them to separate during mixing, leading to the filler being inhomogeneously distributed throughout the binder.

This problem can be solved by feeding the binder and filler separately at different feed rates into an extruder. The extruder then mixes the binder and filler. Within the extruder, heaters and/or friction generated by pushing the materials through the extruder heats and melts the binder, which encapsulates the filler. The composite material extrudate that exits the extruder has a substantially homogeneous distribution of the filler within the binder.

The extruder may be a single screw extruder, double screw extruder, multiscrew extruder, or the like. The selected extruder preferably produces enough torque to minimize binding or slowing down during the extrusion process to help yield a substantially homogeneous extrudate.

In a particular example, a single screw extruder may be used.

Referring to FIG. 2, an example of a single screw extruder 102 includes a barrel 104 defining a substantially cylindrical interior 106 extending from a drive end 108 to a die end 110. A screw 112 positioned within the interior 106 includes a root 114 extending along a radial axis of the interior 106 from the drive end 108 to the die end 110. A plurality of flights 116 are carried by the root 114. A drive unit 118 includes a motor that turns the root 114, which thereby turns the flights 116. A die 113 at the die end 110 defines an orifice 120 through which material is pushed to form an extrudate 122.

The binder 124 and filler 126 are fed to the interior 106 through an input port 128 that provides material access to the interior 106 through the barrel 104. The input port 128 may include a hopper that receives the binder 124 and filler 126 and directs them into the barrel 104.

The input port 128 is positioned adjacent to the drive end 108 of the interior 106 in a feed zone 130 of the interior 106. The binder 124 and filler 126 enter the barrel 104 through the input port 128 and fall into the feed zone 130. The rotating flights 116 begin mixing the binder 124 and filler 126 together in the feed zone 130.

A temperature control unit 140 includes at least one temperature sensor 142 and at least one temperature regulator 144. The temperature sensor 142 may be an electronic thermometer, thermocouple, or the like. The temperature sensor 142 is positioned in the interior 106 or on the barrel 104 and measures the temperature therein. If desired, multiple temperature sensors 142 may be positioned along the interior 106 from the drive end 108 to the die end 110 to obtain temperature measurements of the interior 106 at different positions along the length of the interior 106.

The temperature regulator 144 may be an electronic heater and/or cooler. The temperature regulator 144 is used to heat and/or cool the interior 106 to a desired temperature. If needed, multiple temperature regulators 144 may be positioned along the barrel 104 from the drive end 108 to the die end 110 to provide an even temperature throughout the interior 106 or different temperatures at different positions along the length of the interior 106.

The temperature control unit 140 provides control signals to the temperature regulator 144 to raise or lower the temperature of the interior 106 and receives temperature measurements from the temperature sensor 142. It may not always be necessary to add external heat to the extruder 102 because the friction of mixing the binder 124 and filler 126 in the extruder 102 may be sufficient to generate the desired temperature.

A pressure control unit 146 includes at least one pressure sensor 148 positioned in the interior 106. The pressure sensor 148 may be an electronic pressure sensor such as a pressure transducer or the like. The pressure sensor 148 senses the pressure of the materials being mixed by the screw 112. If needed, multiple pressure sensors 148 may be positioned along the interior 106 from the drive end 108 to the die end 110 to provide different pressure measurements at different positions along the length of the interior 106.

The extrudate 122 is the extruded composite material of the binder 124 and filler 126. When the extrudate 122 exits the die 113 orifice 120, the extrudate 122 may still be hot and relatively flexible. To cool the extrudate 122 into a more rigid structure, the extrudate 122 may be passed through a cooling unit 150. The cooling unit 150 receives the hot extrudate 122 and lowers its temperature using a cooling gas or by contacting the extrudate 122 with a cooling liquid to form a cooled extrudate 152.

The cooled extrudate 152 may be stored as one or more extruded rods or rolls of the cooled extrudate 152 or it may be fed into a pelletizing unit 154 that cuts the cooled extrudate 152 into a plurality of pellets 156 for later use. The individual pellets 156 are composed of a substantially homogenous mixture of the binder 124 and filler 126 as the composite material.

In a different example, the hot extrudate 122 exiting the extruder 102 is placed directly into a mold or converted directly into the form of a completed construction product such as a slab, rod, brick, block, pipe, or the like.

Figure 3:
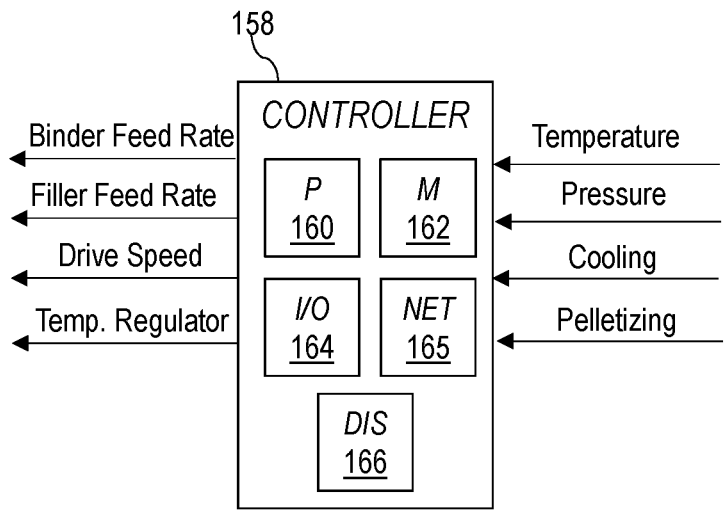
FIG. 3 is a block diagram of an example of a control system.

Referring now to FIGS. 2 and 3, a control system 158 controls the operations of the extruder 102, cooling unit 150, and pelletizing unit 154 using control signals. Referring to FIG. 3, the control system 158 is explained in more detail. The control system 158 is a computing device that includes a processor 160, memory 162, an I/O interface 164, a network adapter 165, and a display 166. These features may communicate with each other through a bus or wirelessly and may be located within a single device or be divided across multiple devices.

An example of the processor 160 is a computer microprocessor such as one that includes one or more processing units such as a central processing unit (CPU) and a graphical processing unit (GPU). The control system 158 may include one or more of the processors 160. In some cases, one or more of the processors 160 may be accessed remotely relative to one or more of the other processor(s) 160.

An example of the memory 162 includes nontransitory memory containing non-transitory computer executable program instructions. Examples of such memory 162 include a random access memory (RAM), a hard disk, a removable storage device, or remote memory such as cloud storage.

The memory 162 stores data and executable program instructions, such as software programs, for performing various computing functions. The processor 160 is capable of executing the program instructions stored on memory 162 to cause the control system 158 to perform computing operations consistent with the systems and methods disclosed herein.

An example of the I/O interface 164 includes hardware and software for communication with the control system 158 by a user. The I/O interface 164 may include, for example, a keyboard, mouse, touch screen, camera, microphone, speaker, and the like.

An example of the network adapter 165 includes hardware and software for allowing the control system 158 to communicate information over a network. Examples of the network adapter 165 may include, for example, a local area network (LAN) adapter, a wireless wide area network (WWAN) adapter, a Bluetooth® module, a near field communication adapter, or the like.

An example of the display 166 is a device that provides a visible output to a user such as, for example, a computer screen, an LCD screen, or the like.

The control system 158 receives input signals from the temperature control unit 140 and pressure control unit 146, including the temperature read by the temperature sensor 142 and pressure read by the pressure sensor 148. The control system 158 also receives operational status information from the cooling unit 150 and pelletizing unit 154.

In conventional polymer extrusion processes, the polymer is premixed with additives prior to introducing the ingredients into an extruder. The inventors discovered that this conventional process is not ideal when the binder 124 and filler 126 are composed of binder and filler materials with very different densities. If the binder 124 and filler 126 are premixed together before being fed into the extruder 102, the filler 126 is not homogeneously distributed throughout the extrudate 122. This problem may be due to vastly different densities of the polymers used as the binder 124 and the materials used as the filler 126.

The inventors resolved this issue by feeding the binder 124 and filler 126 into the extruder 102 separately and at different rates. Here, therefore, the binder 124 and filler 126 are not premixed before being introduced to the input port 128. In contrast, the binder 124 and filler 126 are fed continuously into the extruder 102 at the desired binder:filler ratio, so that the mixing process that occurs within the extruder 102 is performed on a binder/filler mixture that has the desired binder:filler ratio substantially along the entire length of the interior 106.

The control system 158 executes program instructions to independently control the binder feed rate and filler feed rate. These feed rates are the rates in which the binder 124 and filler 126 are fed to the input port 128. The feed rates are provided in units of binder or filler per unit of time. Such units may be, for example, mass, volume, number of pieces, or any other measure of the amount of binder or filler. The binder feed rate and filler feed rate are separately controlled because the relative feed rates are used to define the relative amount of binder 124 and filler 126 in the extrudate 122. By way of example, if the binder feed rate is 75 grams per minute and the filler feed rate is 25 grams per minute, then the binder to filler ratio in the extrudate will be 3:1 or 75% w/w binder:25% w/w filler.

The control system 158 executes program instructions to control the drive speed, which is the rotational speed of the screw 112. Because the mechanical properties of binders and fillers are different, the drive speed may be adjusted accordingly.

The control system 158 executes program instructions to control the temperature regulator 144. Generally, the temperature regulator 144 will elevate or lower the temperature of the interior 106 to a desired set point temperature that is at or above the melting point of the binder 124. The control system 158 may maintain the set point temperature using the temperature sensor 142 and temperature regulator 144 throughout the extrusion process.

The melting points of waste plastic materials at standard pressure are well known. Some examples are listed below.

| Polymer Binder | Melting Point |
| --- | --- |
| Polyethylene Terephthalate | ~260° C. |
| HDPE | ~130° C. |
| LDPE | ~120° C. |
| Polypropylene | ~160° C. |
| PVC | ~210° C. |
| Polystyrene | ~240° C. |

Figure 4:
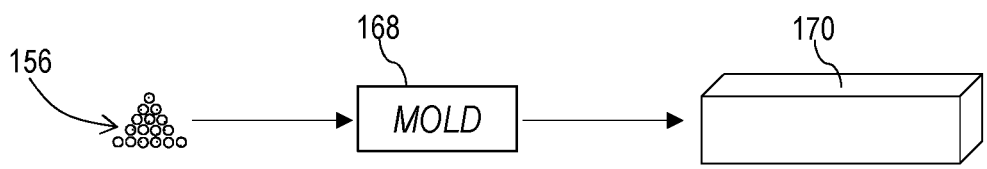
FIG. 4 is a block diagram of a method for making a construction product.

Referring to FIG. 4, the pellets 156 produced by the aforementioned extrusion process may be formed into construction products 170 by providing the pellets 156 to a mold 168 that forms the pellet 156 material into the shape of the desired construction product 170. The mold 168 may be from any conventional plastic molding process such as rotational molding, injection molding, blow molding, compression molding, extrusion molding, thermoforming, or the like. One of the advantages of using the pellets 156 is that they can be melted and formed into the desired shape at a construction site if desired.

One of the advantageous uses of the composite material is as a substitute for concrete construction products. The composite material can be formed into slabs, bricks, blocks, pipes, rods, walkways, driveways, walls, curbs, culverts, and pavers, among many other possible uses.

Long continuous runs of a construction product 170 made of the composite material may be prepared by full width extrusion, rastered extrusion, in-place injection molding, off-site injection molding, or the like. The equipment used to prepare such a construction product 170 may include modular attachments that interface with existing vehicles or mobility systems such as tractors, front end loaders, skid steer loaders, and the like.

A construction product 170 may also be made using an additive manufacturing/construction processes. In this process, the extruder position and velocity and other parameters are controlled to move along trajectories that trace out the desired construction product features while extruding. This construction process can create a large number of desired structure geometries.

The finished construction product 170 may be prepared in several ways, including: pre-made pellets 156 that are formed into a construction product 170 at the construction site; separate filler 126 and binder 124 feedstocks that are extruded during placement at the construction site; or as prefabricated finished construction products 170 that are transported to the construction site.

In one example of producing a long substantially continuous run of composite material, such as to form a sidewalk or the like, a full width extrusion process is used. In this process, the extruder 102 is vertically mounted and includes a single nozzle that spans the desired width of construction product 170 being produced. Alternatively, a plurality of the extruders 102 may be positioned side-by-side to yield wide coverage. The pellets 156 may be delivered to the extruder 102 via a pneumatic conveying system to the input port 128 of the extruder(s) 102. The mobility system carrying the extruder(s) 102 can deposit a full-width of sidewalk, for example, behind it as it moves along at a pace that is tuned to the extrusion rate.

In another example, a rastered extrusion process is used, which is similar to the full-width extrusion process except that a single extruder 102 is rastered across the area of the sidewalk or other construction product 170 being produced. The rastering action traces out the geometry of the construction product 170 and produces a substantially continuous construction product 170 that may have minor seams between raster traces.

In another example, in-place injection or slip molding is used to create a long substantially continuous construction product 170. This process uses a mold 168 having substantially the same dimensions as the construction product 170 being produced, such as a slab of sidewalk, for example. The mold 168 may have an enclosed top surface and three sidewalls where the fourth side is provided by a previously made sidewalk section. The bottom of the mold 168 may be the ground. In this process, melted composite material is molded to create a section of sidewalk. Once a section is completed, the mobility system travels along the sidewalk path to create the next molded section. This process is repeated until the sidewalk is completed.

In another example, prefabricated slabs of the composite material are prepared off site, such as at a fabrication plant. This plant may include an injection or compression molding system capable of producing slabs. The slabs may be prepared at the plant and then transported to the construction site for installation. At the construction site, slabs, such as sidewalk slabs, are positioned and may be secured to other slabs by first melting the adjacent sides of the slabs and then joining the slabs or by other methods. Slabs requiring unique geometries may be prepared at the construction site using one of the above installation techniques.

Using slabs of the composite materials as the construction material for sidewalks may allow for improved sidewalk geometry. For example, since the composite materials may have significantly more flexural strength than conventional concrete, the sidewalk's thickness may be reduced without adversely impacting the performance of the sidewalk. Additionally, the use of injection molding and/or extrusion as construction methods may allow for special shapes to be used that could lead to additional cost savings.

The slabs or other construction products may be molded to include physical features that impart additional mechanical strength to the product, such as wall thickness and raised ribs, among other features. Construction products may be formed with a geometry such as isogrid or orthogrid to yield the same overall mechanical strength properties as a solid piece of composite material, but using much less of the composite material.

The slabs or other construction products may be repaired either on site or at the fabrication location using methods such as heat compression melting, binder addition followed by heat compression melting, or "plugging" followed by heat compression melting. Damaged/degraded slabs or construction materials can also be replaced if the materials are modular.

An example of a method of repairing a construction product, includes repairing a construction product made of the composite material by heating a damaged area of the construction product and manipulating the damaged area to smooth the damaged area. Adding additional binder before heating may be useful if the damage area is large. Adding a preformed plug of composite material followed by heating and pressing may also be used as a repair method for very large damage areas.

A particular method of making a construction product includes forming a composite material including a polymeric binder and a solid filler into at least one construction product selected from a slab, brick, block, pipe, rod, walkway, driveway, wall, curb, culvert, road, and paver. The polymeric binder forms a binder matrix that binds together the filler.

This method may further include, feeding into an extruder the polymeric binder at a first feed rate and the solid filler at a second feed rate, the extruder (a) melting the polymeric binder, (b) mixing the melted polymeric binder with the solid filler, and (c) extruding an extrudate of the polymeric binder and solid filler to form the composite material.

This method may further include one or more of the following features.

The forming step may include a molding step which receives the extrudate directly from the extruder.

The composite material may include 15% w/w to 85% w/w solid polymeric binder and 85% w/w to 15% w/w solid filler.

The first feed rate and second feed rate may be controlled independently of one another.

The first feed rate and second feed rate may be independently selected in such a way that a binder to filler ratio is 85% w/w binder:15% w/w filler to 50% w/w binder:50% w/w filler.

In another example, the first feed rate and second feed rate are independently selected in such a way that a binder to filler ratio is 30% w/w binder:70% w/w filler to 40% w/w binder:60% w/w filler.

The polymeric binder and the solid filler are not mixed together prior to feeding them into the extruder in certain examples.

The composite material may include a plurality of pellets of the composite material.

The solid filler may be glass and the polymeric binder may be at least one of polypropylene, polyethylene, polyvinyl chloride, and polyethylene terephthalate.

The solid polymeric binder may include polyethylene; the solid filler may include granular glass; and the composite material may include 85% w/w to 50% w/w polyethylene and 15% w/w to 50% w/w granular glass.

The solid polymeric binder may include polypropylene; the solid filler may include granular glass; and the composite material may include 40% w/w to 30% w/w polypropylene and 60% w/w to 70% w/w granular glass.

The solid filler may have an average particle size of 0.1 mm to 2.5 mm.

The composite material may have a compressive strength at 10% strain of 2500 psi to 6000 psi.

The composite material may have a tensile strength of 400 psi to 3000 psi.

The composite material may have a flexural stress at 2% strain of 500 psi to 4000 psi.

The solid polymeric binder may be polyethylene or polypropylene and the solid filler may be granular glass. The composite material may include 85% w/w to 50% w/w binder and 50% w/w to 15% w/w granular glass when the binder is polyethylene. The composite material may include 40% w/w to 30% w/w binder and 60% w/w to 70% w/w granular glass when the binder is polypropylene. The composite material may have a compressive strength of 2500 psi to 6000 psi, a tensile strength of 400 psi to 3000 psi, and a flexural stress at 2% strain of 500 psi to 4000 psi.

The method may also include joining together adjacent construction products by heating adjoining surfaces of the adjacent construction products to bond together the adjacent construction products.

An example of another method includes repairing a construction product made of a composite material including a polymeric binder and a solid filler by removing a damaged area of the construction product and repairing the damage section by filling the area with new composite and heating adjacent surfaces to bond the composite.

When using the composite material in a construction product, the risk of microplastics migration into the environment may be decreased by the use of a barrier layer to contain abraded particles or by the use of a wearing course on the surface of the composite to reduce degradation of the composite.

EXAMPLES

This section describes examples of certain particular composite materials and methods. These examples do not limit the scope of what is claimed in any way.

Example 1: Composite Materials Preparation

Recycled crushed granular glass, recycled concrete, and sand were selected as filler materials used in this example. The filler materials were dried in an oven overnight at 230° F. to remove moisture. Because the flight depth and die diameter of the single screw extruder were approximately ⅛ inch (3.2 mm), the particle size of the filler materials was kept to less than 0.093 inch (2.4 mm) to reduce the likelihood of jamming during processing by passing them through an ASTM #14 sieve. Any large particles retained on the sieve were discarded. FIG. 5 provides the % w/w of each filler material that passed through various sieve sizes.

Polyethylene (PE) and polypropylene (PP) were selected as the binder materials in this example. A general PE formulation was used rather than colored HDPE due to availability and relative similarity of materials.

The binder and filler materials were combined to form a composite extrudate using a Brabender® Plasti-Corder® single screw extruder. The filler and binder materials were fed into the hopper of the extruder using separate volumetric feeders. The feed rate to the extruder of the filler and binder were maintained at the desired level throughout the extrusion process by controlling the rate of each feeder to reach the desired binder:filler ratio.

Inside the extruder barrel, a 1.25 inch diameter screw pushed the materials down the barrel and forced the extrudate through the die. The materials were mixed and melted inside the barrel of the extruder. The temperature profile along the screw length was adjusted based on the known polymer melting temperatures and tuned to ensure materials achieved the desired state as they formed an extrudate. For both PE and PP, the barrel temperature was set to 200° C.

The extrudate leaving the die was hot and relatively malleable. To solidify the extrudate, it was fed through a chilled water bath. The cooled extrudate was drawn out of the chilled water bath and dried by a compressed air stream. A pelletizer chopped the cooled and dried extrudate into pellets of the desired length.

FIG. 6 is a matrix of the different binder/filler combinations used in this example. The numbers represent the filler:binder ratio in terms of the % w/w of the specified material.

Example 2: Injection Molding the Composite Materials

The pellets produced as discussed above were injection molded into molds that could be used to evaluate of the mechanical properties of each sample. The molds complied with American Society for Testing and Materials (ASTM) standard specifications.

The mechanical properties assessed were compressive strength, tensile strength, and flexural strength. The dimensions of the test samples were defined in a way that the shot volume capacity of the injection molder would not be exceeded. ASTM C39/C78/C192/C293/C496/D638/D695/D790/D7264 specifications were used to determine the shape and dimensions of the test samples in accordance with the maximum particle size.

Example 3: Mechanical Testing of Injection Molded Samples

The mechanical properties of the injection molded samples were determined by performing compressive, tensile, and flexural strength tests. Since the composite material may be used as a construction product, comparisons were made between the composite materials and normal-strength structural concrete. FIG. 7 is a table of strength values of normal strength structural concrete.

Even though compressive strength is the easiest and most frequently used way to compare any material to concrete, the type and use of the structure to be built will determine the preferred design strength. Structures that transfer compressive loads, such as columns and foundations, are designed based on compressive strength whereas power transmission lines and towers, and suspension bridges, are mainly designed based on tensile strength to be able to carry tensile loads. In addition, slab-like structures such as highways, roads, airport pavement/runways, driveways, and sidewalks are designed based on the material's flexural strength.

The abbreviations used in the mechanical property tests are shown below.

| | |
|---|---|
| PP: polypropylene | PE: polyethylene |
| $G_c$: coarse glass | RC: reinforced concrete |
| $G_m$: medium glass | C: concrete |
| $G_f$: fine glass | S: sand |

The samples were tested according to the corresponding ASTM standard specifications. To ensure the repeatability of the tests, at least five samples per strength type were tested. Force and deformation/deflection values were measured and recorded for each test sample. The dataset obtained at the end of the strength tests was reduced to a level that could be handled by standard commercially available software. Subsequently, the force and deformation data were converted into stress and strain values. Statistical analysis was conducted on these values, first to find the quartiles and outliers and second to find the descriptive statistics values such as mean (average), median, maximum, minimum, standard deviation (Stdev), and coefficient of variation (COV) values.

Compressive Strength Tests

Compressive strength is the capacity of a material to bear the loads tending to squeeze it or the resistance of the material to being flattened. It can be calculated by dividing the maximum load (in pounds) at failure to the original cross-sectional area (in square inches) where the load is applied. The final value is reported in pounds per square inches (psi).

The compressive strength of the composite materials is an important parameter since concrete is typically manufactured and sold based on its compressive strength. It is also the basic design value for most concrete structures.

Compressive strength test samples were prepared according to the corresponding ASTM standard. The test procedure followed ASTM D695 standard specifications. The compressive strengths of the samples were evaluated on 1 inch diameter by 2.2 inch high cylindrical samples.

Most of the samples did not reach their ultimate breaking point and lose internal integrity.

Figure 8:
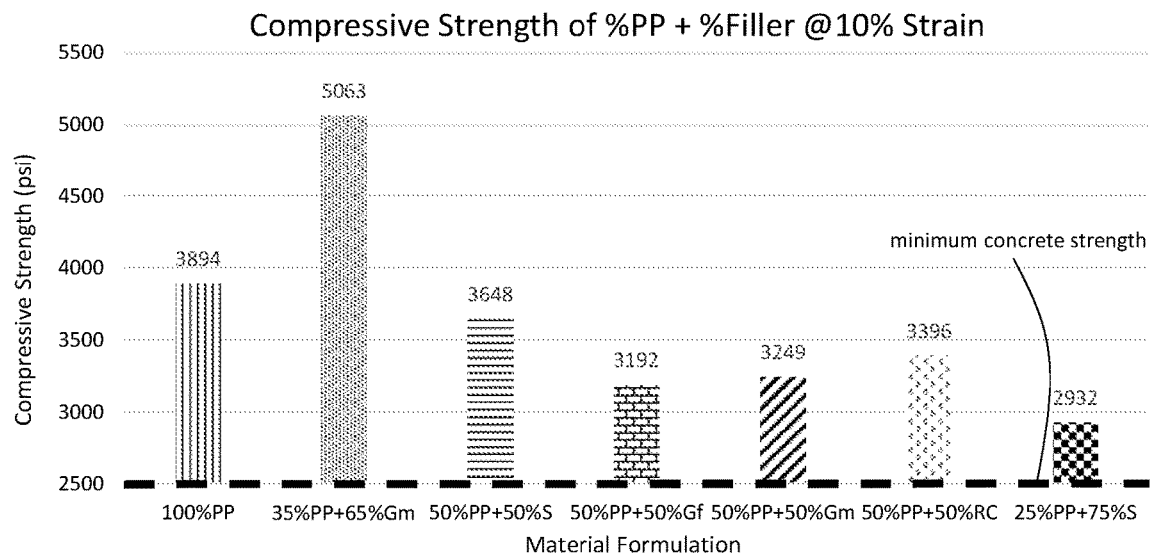
FIG. 8 is a graph of the compressive strength at 10% strain of composite material samples with PP as the binder.

FIG. 8 is a graph of the compressive strength values for different samples prepared with different filler materials and PP binder at changing percentages by weight. The compressive strength values are given at 10% strain value for comparison since most of the mixtures never failed and the termination criterion was met, which was set as the 50% longitudinal deformation.

The compressive strength of any samples prepared with a PP binder satisfied the minimum requirement for structural concrete by passing 2500 psi threshold value. The sample of 35% w/w PP and 65% w/w Gm mixture showed superior performance achieving over 5000 psi compressive strength at 10% strain, which is 23% more than the control sample of PP alone. As the amount of filler material was increased from 50% to 75%, the compressive strength surprisingly increased. This indicates that there may be an optimum % w/w of filler for obtaining the highest possible compressive strength value. This optimum amount for compressive strength is likely between 50% w/w to 75% w/w filler.

Figure 9:
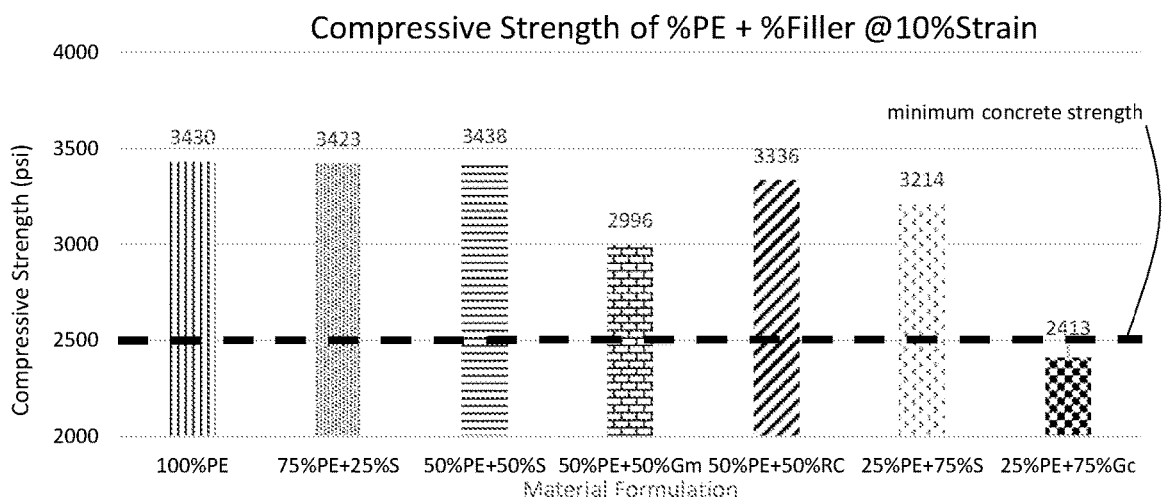
FIG. 9 is a graph of the compressive strength at 10% strain of composite material samples with PE as the binder.

FIG. 9 is a graph of the compressive strength at 10% strain values for different samples prepared with different filler materials and PE binder at changing percentages by weight. A trend between binder:filler ratios was observed for the PE binder samples as well. All material formulations other than 25% w/w PE and 75% w/w Gc passed the 2500 psi minimum concrete strength threshold value.

Initially, for PE the ultimate compressive strength increased with increasing % w/w filler, but eventually decreased as the % w/w filler increased. This may be due to of the ability of the binder to wet or coat the filler. As the % w/w filler increased, the ultimate compressive strength of the composite material increased since the load-carrying capacity of the filler is higher than the binder itself. Once the % w/w filler reached a certain level however, it might be harder for the PE binder to wet the increased surface area of the filler. Thus, the compressive strength of the mixture decreases with the addition of filler material beyond a certain saturation level. The same behavior was not observed, however, for the PP binder.

Figure 10:
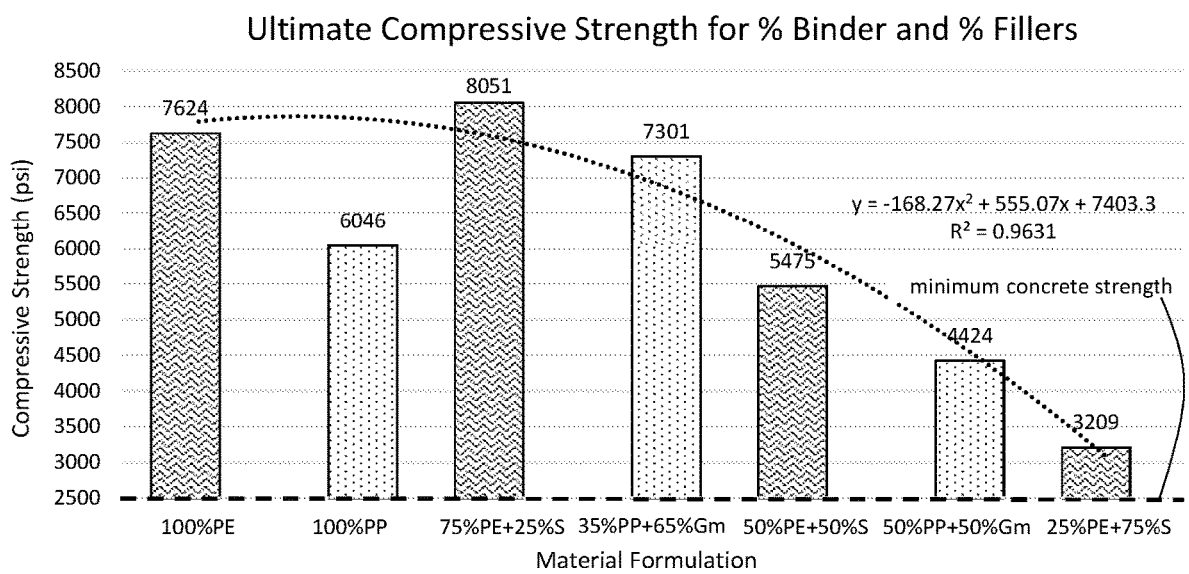
FIG. 10 is a graph of the ultimate compressive strength for PE/Sand and PP/Gm samples at changing % w/w.

The graph in FIG. 10 demonstrates the change in ultimate compressive strength for only the PE/sand and PP/Gm samples at different percentages. In this context, the ultimate compressive strength is reached when the sample height is reduced by about 50% to 65% without breaking the sample.

For PE, the ultimate compressive strength increased with the introduction of 25% w/w filler materials. As the amount of filler was increased to 50% w/w and then 75% w/w the ultimate compressive strength decreased. A second degree polynomial trend line with $R^2=0.9631$ was fitted to the PE data. This equation can be used to approximate the compressive strength with changing percent of sand as the filler material in PE binders. For the PP binder, the highest ultimate compressive strength was obtained from the 35% PP sample.

FIG. 11 is a table of the ultimate compressive strength along with the percent strain values and compressive strength values at 10% strain.

Tensile Strength Tests

Tensile strength is the breaking stress point as the material is pulled away. Due to the high ductility of the composite materials, the tensile strength tests were performed on dog bone shaped samples. These samples were obtained from the rectangular samples prepared for the flexural strength tests by using a CNC mill to reduce the dimension of the section of the prismatic samples as per the ASTM D638 standard test method for tensile properties of plastics. The sample deformations were measured and recorded using 1 inch gauge laser extensometer. The tensile strength of the samples was calculated using the following equation.

$$\sigma_t = \frac{P}{A} = \frac{\text{Load(lbs)}}{\text{Area}(\text{in}^2)}$$

$\sigma_t$=tensile strength (psi)
P=tensile load (lbs)
A=area (in$^2$)

b=width of the test sample, approximately 0.5 (in)
h=thickness/height of the test sample, approximately 0.1875 (in)

Figure 12:
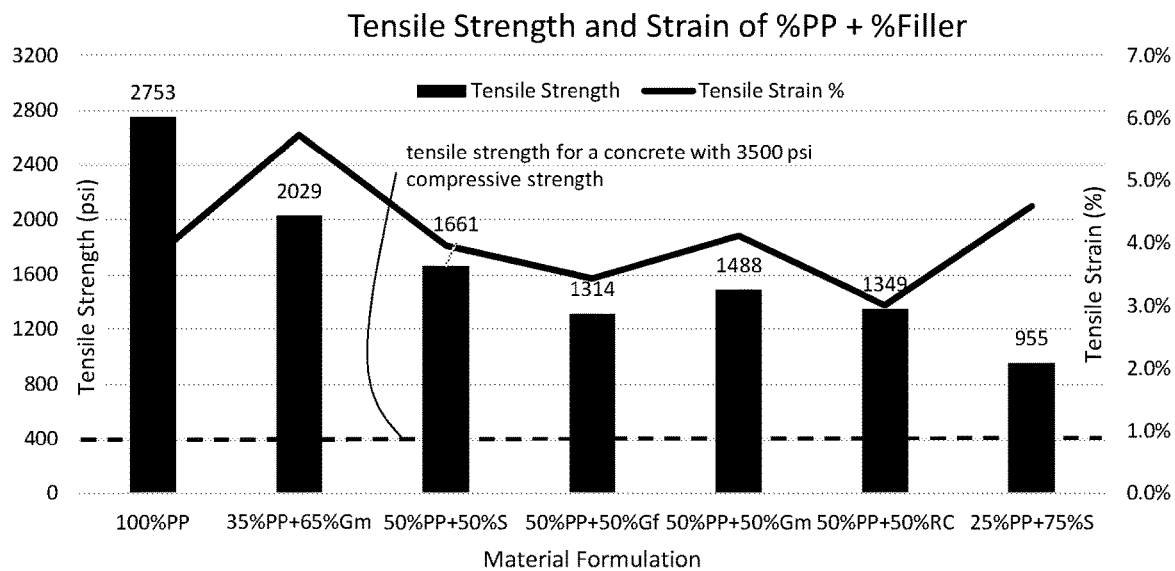
FIG. 12 is a graph of the tensile strength and percent tensile strain of the samples with a PP binder.
Figure 13:
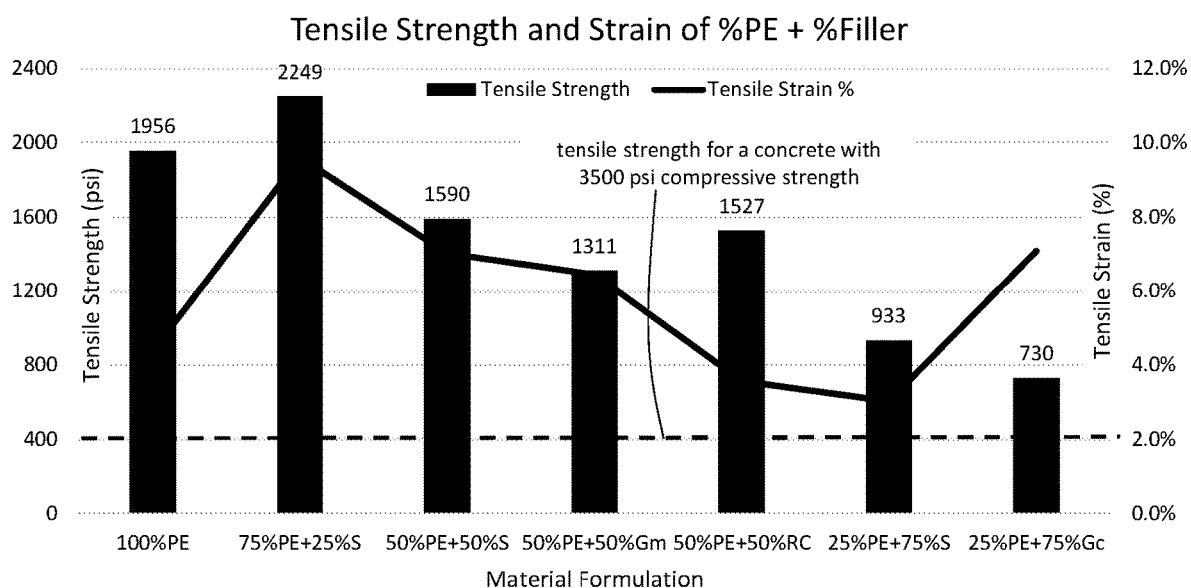
FIG. 13 is a graph of the tensile strength and percent tensile strain of the samples with a PE binder.

FIGS. 12 and 13 are graphs of the tensile strength and strain for the samples with a PP and PE binder, respectively. The dashed line in both figures is the tensile strength of concrete with 3500 psi compressive strength, which is 1000 psi higher than the minimum threshold value. 3500 psi concrete is used much more frequently than 2500 psi concrete. This provides a comparison between the tensile strength of concrete and the composite materials tested. The composite materials had approximately two to six times better tensile strength than concrete.

The composite materials with a PP binder had higher average tensile strength than those with a PE binder, while the composite materials with a PE binder had higher average tensile strain than those with the PP binder. Higher tensile strain implies more ductility, which may result in more energy absorption by the material. Regardless of the binder type, the percent strain followed a very similar trend for mixtures prepared with PE and PP.

FIG. 14 is a table of the maximum tensile strength along with the maximum percent strain values.

Flexural Strength Tests

Flexural strength is the ability of a material to resist deformation under a flexure test. Flexural strength is also referred to as modulus of rupture (MoR), bend strength, or transverse rupture strength. It is an important parameter in designing slab-like structures such as roads, highways, airport pavement, and sidewalks since the mode of failure for these types of structures is flexural fatigue so long as the ratio of compressive stress to compressive strength is relatively small compared to the ratio of flexural stress to the flexural strength.

Flexural strength testing was performed on samples prepared according to ASTM D790 and ASTM D7264. The use of multiple standards was necessary to determine the shape and dimension of the test samples since none of the standard specifications would cover the scope of these tests. Flexural strength samples were prepared as rectangular prisms having thickness 0.1875 inch, width 0.75 inch, and length 7.2 inch. The tests were conducted using 4-point loading.

Flexural strength and flexural strain of the test samples were calculated using the following equations.

$$\sigma_f = \frac{3*P*L}{4*b*h^2}$$

$$\varepsilon = \frac{4.36*\delta*h}{L^2}$$

$\sigma_f$=flexural strength (psi)
$\varepsilon$=maximum flexural strain (in/in)
$\delta$=deflection
P=flexural load (lbs)
b=width of the test sample, approximately 0.7500 (in)
h=thickness/height of the test sample, approximately 0.1875 (in)
L=span length, approximately 6.000 (in), 0.6000 inches overhang from each end FIG. 15 summarizes the flexural strength at 2% strain and ultimate flexural strength with the corresponding strain values for all the composite materials tested. The ultimate flexural strength of the materials occurred at a strain value less than 2%. The flexural stress at 2% strain was selected for comparison reasons since the flexural strength samples never failed under the applied loads. The tests were terminated at a strain value of approximately 3% to prevent the samples from sliding off the supports.

Figure 16:
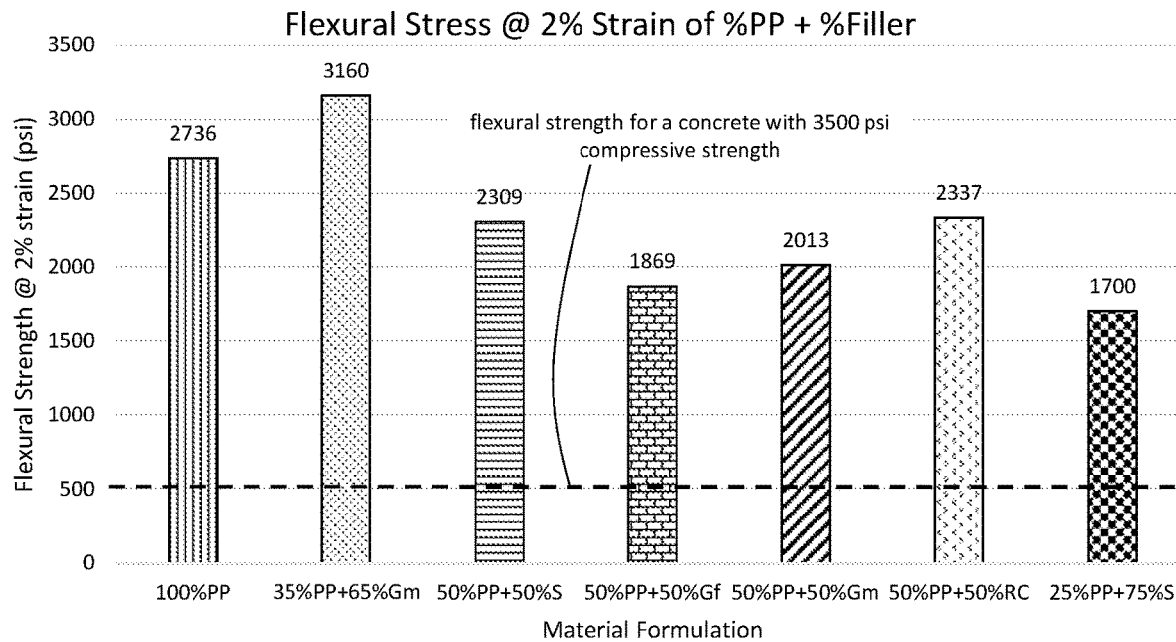
FIG. 16 is a graph of the flexural strength of the samples with a PP binder at 2% strain.
Figure 17:
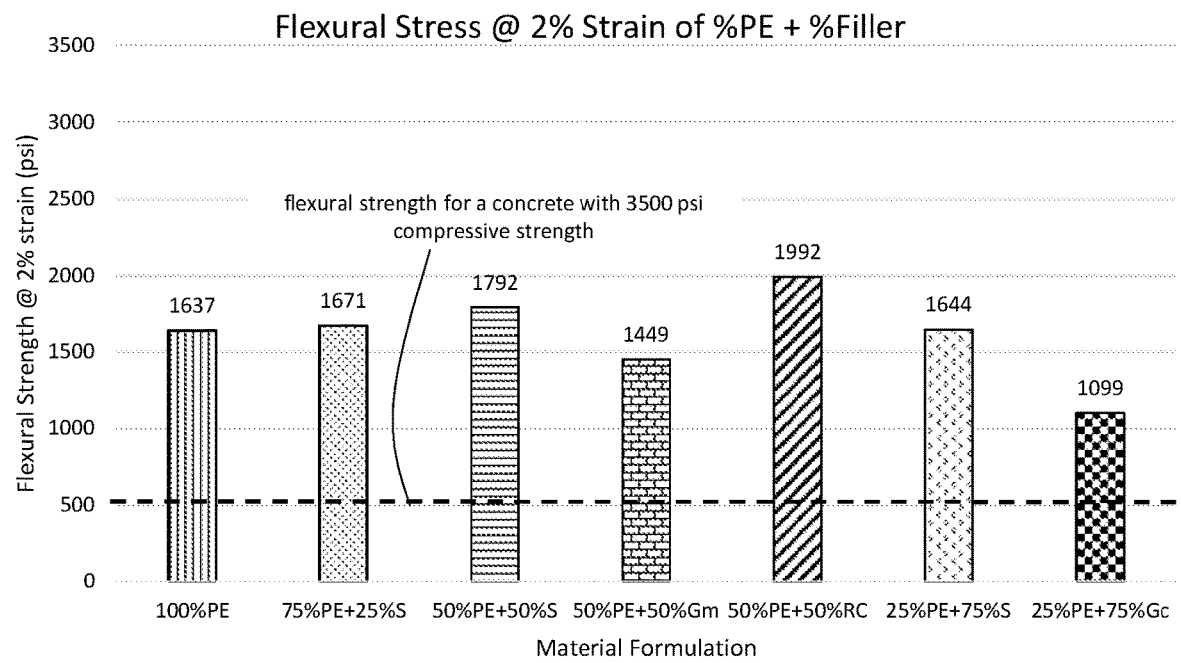
FIG. 17 is a graph of the flexural strength of the samples with a PE binder at 2% strain.

FIGS. 16 and 17 are graphs of the flexural strength at 2% strain level of samples prepared with PP and PE binders, respectively. The dashed lines in the figures demonstrate the flexural strength of a typical concrete with 3500 psi compressive strength. The flexural strength of any of the materials was between two to six times higher than that of concrete.

The materials with a PP binder had higher flexural strength than the materials with the PE binder. Higher flexural strength allows for smaller structure thickness. The amount of load carried safely by a thickness of normal strength concrete could be supported by a thinner composite material structure. As a result of thinner structures, the cost of labor, material, and equipment may be reduced.

The composite materials discussed herein may advantageously be prepared based on the typical contents of municipal curbside recycling stream items. These composite materials may be used as an alternative to concrete for construction of many different construction products in which concrete would normally be used. Examples include sidewalks, curbs, culverts, parking bumpers/curbs, pump housings, bricks, cinder blocks, and roads, driveways, pipes, and buildings, among others.

Example 4: Life Cycle Analysis and Environmental Testing

Life cycle analysis showed that making the composite material has lower energy consumption, lower water use, and lower greenhouse gas emissions than conventional structural concrete. It also showed the use of recycled materials versus concrete's use of raw materials diverts waste from landfills.

Environmental risk analysis showed the composite materials release lower levels of hazardous chemicals into the environment than traditional concrete and asphalt.

This refers to particular features of the composite materials and methods. Although certain features may be described in combination with a particular example of the materials and/or methods, any feature described with respect to one example of the materials and/or methods may be used in any of the other example embodiments to the extent possible.

The skilled person will understand that the composite materials and methods may be modified in many different ways without departing from the scope of what is claimed. The scope of the claims is not limited to only the particular features and examples described above.

That which is claimed is:

1. A method comprising preparing a composite material from a solid polymeric binder and a solid filler by feeding into an extruder the solid polymeric binder at a first feed rate and the solid filler at a second feed rate, the extruder (a) melting the solid polymeric binder, (b) mixing the melted solid polymeric binder with the solid filler, and (c) extruding an extrudate of the solid polymeric binder and solid filler to form the composite material, the composite material having a binder to filler ratio determined by the first feed rate and second feed rate;

wherein the solid polymeric binder and solid filler have different densities and feeding the solid polymeric binder at the first feed rate and the solid filler at the second feed rate distributes the solid filler substantially homogeneously throughout the composite material.

2. The method of claim 1, wherein the solid polymeric binder is a recycled solid polymeric binder and the solid filler is a recycled solid filler.

3. The method of claim 1, wherein the first feed rate and second feed rate are controlled independently of one another.

4. The method of claim 1, wherein the solid polymeric binder and the solid filler are not mixed together prior to feeding them into the extruder.

5. The method of claim 1, wherein the solid filler is granular glass and the solid polymeric binder is at least one of polypropylene, polyethylene, polyvinyl chloride, and polyethylene terephthalate.

6. The method of claim 1, wherein the composite material includes 15% w/w to 85% w/w solid polymeric binder and 85% w/w to 15% w/w solid filler.

7. The method of claim 1, wherein the solid polymeric binder includes polyethylene; the solid filler includes granular glass; and the composite material includes 85% w/w to 50% w/w polyethylene and 15% w/w to 50% w/w granular glass.

8. The method of claim 1, wherein the solid polymeric binder includes polypropylene; the solid filler includes granular glass; and the composite material includes 40% w/w to 30% w/w polypropylene and 60% w/w to 70% w/w granular glass.

9. The method of claim 1, wherein the first feed rate and second feed rate are independently selected in such a way that a binder to filler ratio is 85% w/w binder:15% w/w filler to 50% w/w binder:50% w/w filler.

10. The method of claim 1, wherein the first feed rate and second feed rate are independently selected in such a way that the binder to filler ratio is 30% w/w binder:70% w/w filler to 40% w/w binder:60% w/w filler.

11. The method of claim 1, wherein the solid filler has an average particle size of 0.1 mm to 2.5 mm.

12. The method of claim 1, further comprising molding the composite material into a construction product selected from at least one of slab, brick, block, pipe, rod, walkway, driveway, wall, curb, culvert, road, and paver.

13. The method of claim 1, further comprising molding the composite material into a construction product selected from at least one of slab, brick, block, pipe, rod, walkway, driveway, wall, curb, culvert, road, and paver, wherein the composite material is 80% w/w to 25% w/w solid polymeric binder and 20% w/w to 75% w/w solid filler.

14. The method of claim 1, wherein:
the solid polymeric binder is polyethylene or polypropylene;
the solid filler is granular glass;
the composite material includes 85% w/w to 50% w/w binder and 15% w/w to 50% w/w granular glass when the solid polymeric binder is polyethylene;
the composite material includes 40% w/w to 30% w/w binder and 60% w/w to 70% w/w granular glass when the solid polymeric binder is polypropylene;
the composite material has a compressive strength at 10% strain of 2500 psi to 6000 psi;
the composite material has a tensile strength of 400 psi to 3000 psi; and
the composite material has a flexural stress at 2% strain of 500 psi to 4000 psi.

15. A composite material comprising:
85% w/w to 50% w/w polyethylene binder; and
15% w/w to 50% w/w granular glass filler;
the polyethylene binder forming a binder matrix that binds together the granular glass filler.

16. The composite material of claim 15, comprising 80% w/w to 60% w/w polyethylene binder and 20% w/w to 40% w/w granular glass filler.

17. The composite material of claim 15, wherein the granular glass filler has an average particle size of 0.1 mm to 2.5 mm.

18. The composite material of claim 15, wherein the composite material is an extrudate and the granular glass filler is substantially homogeneously distributed within the binder matrix.

19. The composite material of claim 15, wherein the composite material is a construction product selected from at least one of a slab, brick, block, pipe, rod, walkway, driveway, wall, curb, culvert, road, and paver.

20. The composite material of claim 15, wherein the composite material is a construction product selected from at least one of slab, brick, block, pipe, rod, walkway, driveway, wall, curb, culvert, road, and paver, wherein the composite material is 80% w/w to 25% w/w solid polymeric binder and 20% w/w to 75% w/w solid filler.

21. The composite material of claim 15, having:
a compressive strength at 10% strain of 2500 psi to 6000 psi;
a tensile strength of 400 psi to 3000 psi; and
a flexural stress at 2% strain of 500 psi to 4000 psi.

22. The composite material of claim 15, wherein the polyethylene is recycled polyethylene and the granular glass is recycled glass.

23. A composite material comprising:
40% w/w to 30% w/w polypropylene binder; and
60% w/w to 70% w/w granular glass filler;
the polypropylene binder forming a binder matrix that binds together the granular glass filler.

24. The composite material of claim 23, comprising 32% w/w to 38% w/w polypropylene binder and 68% w/w to 62% w/w granular glass filler.

25. The composite material of claim 23, wherein the granular glass filler has an average particle size of 0.1 mm to 2.5 mm.

26. The composite material of claim 23, wherein the composite material is an extrudate and the granular glass filler is substantially homogeneously distributed within the binder matrix.

27. The composite material of claim 23, wherein the composite material is a construction product selected from at least one of a slab, brick, block, pipe, rod, walkway, driveway, wall, curb, culvert, road, and paver.

28. The composite material of claim 23, wherein the composite material is a construction product selected from at least one of slab, brick, block, pipe, rod, walkway, driveway, wall, curb, culvert, road, and paver, wherein the composite material is 80% w/w to 25% w/w solid polymeric binder and 20% w/w to 75% w/w solid filler.

29. The composite material of claim 23, having:
a compressive strength at 10% strain of 2500 psi to 6000 psi;
a tensile strength of 400 psi to 3000 psi; and
a flexural stress at 2% strain of 500 psi to 4000 psi.

30. The composite material of claim 23, wherein the polypropylene is recycled polypropylene and granular glass is recycled glass.

* * * * *